United States Patent [19]
Porret et al.

[11] 3,917,637
[45] Nov. 4, 1975

[54] N-HALOGENOOXAALKYL DERIVATIVES OF HYDANTOINS

[75] Inventors: Daniel Porret, Binningen; Jürgen Habermeier, Pfeffingen, both of Switzerland

[73] Assignee: Ciba-Geigy Corporation, Ardsley, N.Y.

[22] Filed: Nov. 27, 1973

[21] Appl. No.: 419,314

[30] Foreign Application Priority Data
Dec. 12, 1972  Switzerland.................... 18029/72

[52] U.S. Cl. ............................................. 260/309.5
[51] Int. Cl.² ......................................... C07D 49/34
[58] Field of Search ................................. 260/309.5

[56] References Cited
UNITED STATES PATENTS
2,498,300  2/1950  Scott et al. ..................... 260/309.5
3,213,104  10/1965  Cashin et al. ..................... 260/309.5

FOREIGN PATENTS OR APPLICATIONS
2,090,470  1/1972  France ............................ 260/309.5
1,337,269  11/1973  United Kingdom.............. 260/309.5
439,302    12/1967  Switzerland...................... 260/260
490,008    6/1970   Switzerland...................... 260/260
3,819,988  9/1963   Japan.............................. 260/309.5
1,165,029  10/1958  France............................ 260/309.5

OTHER PUBLICATIONS

R. Behrend et al., Liebigs Ann. Chem., 365, 38(1909).

L. M. Long et al., Journ. Amer. Chem. Soc., 70, 900(1948).

K. Schlogl et al., Journ. Med. Chem., 4, 231,256(1961).

C.A. 66:37835q.

*Primary Examiner*—Ethel G. Love
*Attorney, Agent, or Firm*—Luther A. R. Hall

[57]  ABSTRACT

3-Chloroalkyl- and 3-bromoalkylhydantoins are prepared. These compounds are reactive partners for condensation reactions. A preferred compound is 3-(3-oxa-5-chloropentyl)-5,5-dimethylhydantoin.

6 Claims, No Drawings

N-HALOGENOOXAALKYL DERIVATIVES OF HYDANTOINS

The invention relates to 3-chloroalkylhydantoins and 3-bromoalkylhydantoins as well as 3-chloroalkyldihydrouracils and 3-bromoalkyl-dihydrouracils, and processes for the manufacture of these compounds.

The new compounds are crystalline substances. They are reactive partners for condensation reactions.

Whilst German Offenlegungsschrift No. 2,064,474 discloses 3-halogenomethyl-hydantoins substituted in the 1-position, these compounds suffer from the disadvantage that they possess only a single reactive group.

The compounds according to the invention have the following formula I:

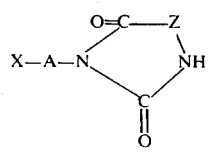

wherein Z denotes a nitrogen-free divalent radical which is required to complete a 5-membered or 6-membered heterocyclic ring, A denotes an alkylene group with one to 12 carbon atoms lower oxaalkylene, preferably 3-oxapentamethylene, and X denotes chlorine or bromine.

Z preferably represents a methylene group which can be substituted by alkyl groups with one to six carbon atoms or a cycloalkyl group, such as the methylene group or especially the propylidene-(2,2) group, and also the n- or isopropylmethylene group, the cyclohexylidene-(1,1) group or the cyclopentylidene-(1,1) group. Further, Z can also denote an ethylene group which is optionally substituted by alkyl groups with one to four carbon atoms, such as the ethylene, the 1,2-dimethylethylene, the 2,2-dimethylethylene or the 1-methyl-2-isopropyl-ethylene group.

A preferably denotes an alkylene group with two to six carbon atoms, especially the ethylene group, or the radical of diethyl ether, namely 3-oxapentamethylene.

The new compounds are valuable partners for condensation reactions, since they possess two reactive groups — a halogenoalkyl group and a reactive hydrogen, or two halogenoalkyl groups. They can condense with alcohols, phenols and the like, and especially also with alkyl esters of phosphorous acid, to give dialkoxyphosphonomethylhydantoins or dialkoxyphosphonomethyldihydrouracils. These compounds can be used, for example, as flameproofing additives in plastics.

The compounds are obtained according to methods which are in themselves known, by reaction of hydantoins or dihydrouracils which are unsubstituted in the 3-position, with a compound of the formula II $$X-A-X \qquad (II)$$

in the presence of agents which split off hydrogen halide, such as alkalis, for example potassium hydroxide or sodium hydroxide, or strongly basic salts, for example alkali metal carbonates.

The compounds of the formula II are preferably employed in large excess in order to suppress side-reactions as far as possible.

Preferred compounds of the formula II are $\omega,\omega'$-dichloroalkanes with two to six carbon atoms, especially $\beta,\beta'$-dichloroethane or $\beta,\beta'$-dichlorodiethyl ether.

EXAMPLES 1. 3-($\beta$-Chloroethyl)-5,5-dimethyl-hydantoin

A mixture of 1,664 g of 5,5-dimethyl-hydantoin (13.0 moles), 897 g of anhydrous potassium carbonate (6.5 mols), 5.148 g of 1,2-dichloroethane (52 mols) and 1,485 ml of dimethylformamide is reacted for 18 hours and 20 minutes at 90°C to 100°C internal temperature (external temperature 155°C), whilst constantly removing the resulting water of reaction by azeotropic circulatory distillation. Water of reaction split off: 110 g (94.0% of theory). The reaction mixture, whilst still hot, is then separated by filtration from the potassium chloride produced, the filtrate is concentrated on a rotary evaporator at 100°C in a waterpump vacuum, and the residue is dried to constant weight at 100°C and $10^{-1}$ mm Hg.

2,385 g of a clear, brown highly viscous substance (96.2% of theory) are obtained.

The crude product is distilled at 0.1 to 0.2 mm Hg and 146°-149°C: Yield of pure product, 2,068.3 g (83.4% of theory).

A sample recrystallised from methanol melts at 95.8°C to 96.2°C and displays the following analytical data:

| Found: | Calculated: |
|---|---|
| 44.13% C | 44.10% C |
| 5.91% H | 5.82% H |
| 14.67% N | 14.70% N |
| 18.54% Cl | 18.60% Cl |

2. 3-($\beta$-Chloroethyl)-5-methyl-5-ethyl-hydantoin 284.3 g of 5-methyl-5-ethyl-hydantoin (2.0 mols), 138.2 g of anhydrous potassium carbonate (1.0 mol), 791.7 g of 1,2-dichloroethane (8.0 mols) and 230 ml of dimethylformamide are subjected to an azeotropic circulatory distillation, as described in Example 1, for 25 hours at 90°C to 107°C internal temperature (external temperature: 160°C). After completion of the reaction, the mixture, whilst still hot, is filtered and the filtrate is concentrated on a rotary evaporator at 90°C under a waterpump vacuum. The reaction mixture is then dried to constant weight at 90°C and $10^{-1}$ mm Hg. 392.5 g of a brown, clear product (95.9% of theory), which is purified by vacuum distillation (boiling point$_{0.2}$ : 147°C) are obtained. Yield of pure product: 327.3 g (80% of theory).

A sample recrystallised from diethyl ether melts at 58.0°C to 59.0°C.

| Analytical data: | Found: | Calculated: |
|---|---|---|
| | 47.23% C | 46.95% C |
| | 6.56% H | 6.40% H |
| | 13.61% N | 13.69% N |
| | 17.36% Cl | 17.32% Cl |

3. 3-($\beta$-Chloroethyl)-5,5-pentamethylene-hydantoin 336.4 g of 5,5-pentamethylene-hydantoin (2.0 mols), 138.2 g of anhydrous potassium carbonate (1.0 mol), 791.7 g of 1,2-dichloroethane (8.0 mols) and 300 ml of dimethylformamide are reacted as in Example 1. After 21¾ hours' reaction time at 101°C to 117°C internal temperature (external temperature 160°C) the reaction is complete and the reaction mixture is filtered whilst still hot. The filtrate is worked up as in Example 1. 460.8 g of a brownish crystalline product (99.86% of theory) of melting point 154°C to 156.4°C are obtained. Recrystallisation of the crude product from toluene in the ratio of 1:1.6 gives the pure compound in 86% yield and with melting point 156°C – 158°C.

| Micro-analysis: | Found: | Calculated: |
|---|---|---|
| | 51.83% C | 52.06% C |
| | 6.67% H | 6.55% H |
| | 12.27% N | 12.14% N |
| | 15.11% Cl | 15.37% Cl |

The 60 Mc H-NMR spectrum can be reconciled with the following structure

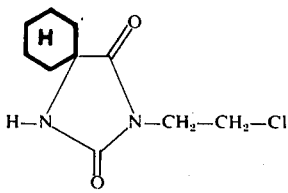

4. 3-(6-Chloro-n-hexyl)-5,5-dimethyl-hydantoin 128 g of 5,5-dimethyl-hydantoin (1.0 mol), 69 g of anhydrous potassium carbonate (0.5 mol) and 775 g of 1,6-dichlorohexane are reacted at 132°–150°C internal temperature (external temperature 160°C) and the resulting water of reaction is continuously removed by azeotropic circulatory distillation. The reaction is complete after 6 hours 25 minutes and the reaction mixture is filtered hot to remove the potassium chloride formed. The filtrate is concentrated on a rotary evaporator and the material is dried to constant weight at 100°C and $10^{-1}$ mm Hg.

224 g of a brown, highly viscous crude product (90.8% of theory) are obtained and are purified by vacuum distillation (boiling point$_{0.02}$=136°–151°C). Yield of pure product: 152.7 g (61.9% of theory); melting point: 39.8° to 44°C; chlorine content: 12.69% Cl.

5. 3-(3-Oxa-5-chloro-pentyl)-5,5-dimethyl-hydantoin 640 g of 5,5-dimethyl-hydantoin (5.0 mols), 345.5 g of anhydrous potassium carbonate (2.5 mols) and 2,860 g of β,β'-dichlorodiethyl ether (20.0 mols) are subjected to an azeotropic circulatory distillation for 6 hours 20 minutes at 121° to 152°C internal temperature (external temperature 170°C). The mixture is worked up as described in Example 1 and 994 g of a brown viscous crude product (84.7% of theory) are obtained. Vacuum distillation and subsequent recrystallisation from diethyl ether gives pure β-chloro-β'-(5,5-dimethyl-hydantoinyl-3)-diethyl ether or [3-(3-oxa-5-chloro-pentyl)-5,5-dimethyl-hydantoin] of melting point 55.4°C to 57.4°C.

| Elementary analysis: | Found: | Calculated: |
|---|---|---|
| | 45.99% C | 46.06% C |
| | 6.41% H | 6.44% H |
| | 11.73% N | 11.94% N |
| | 14.92% Cl | 15.11% Cl |

6. 3-(4-Chlorobutyl)-5,5-dimethyl-hydantoin

A mixture of 538 g of 5,5-dimethyl-hydantoin (4.2 mols), 290 g of anhydrous potassium carbonate (2.1 mols) and 2,130 g of 1,4-dichloro-butane (16.77 mols) is reacted as described in Example 1, for 8 hours at 138° to 141°C internal temperature (external temperature 200°C). Working up is carried out according to Example 1 and 830.9 g of a brown viscous crude product (90.5% of theory) are obtained and are purified by vacuum distillation (boiling point$_{0.2}$: 151°–153°C) and subsequent recrystallisation from diethyl ether. The pure product melts at 54.4° to 56.3°C.

| Analytical data: | Found: | Calculated: |
|---|---|---|
| | 49.26% C | 49.43% C |
| | 7.02% H | 6.91% H |
| | 13.1% N | 12.81% N |
| | 15.72% Cl | 16.21% Cl |

We claim:
1. A halogenoalkylhydantoin of the formula

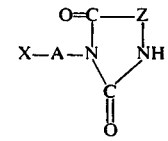

wherein
Z denotes methylene optionally substituted with alkyl of one to six carbon atoms or Z denotes cycloalkylidene of five to six carbon atoms,
A denotes lower oxaalkylene, and
X denotes chlorine or bromine.

2. A compound according to claim 1 wherein Z denotes methylene optionally substituted with alkyl of one to six carbon atoms or Z denotes cycloalkylidene of five to six carbon atoms and X denotes chlorine.

3. A compound according to claim 2 wherein Z is isopropylidene.

4. A compound according to claim 2 wherein Z is cyclohexylidene.

5. A compound according to claim 1 wherein A is 3-oxapentamethylene.

6. The compound according to claim 1 which is 3-(3-oxa-5-chloropentyl)-5,5-dimethylhydantoin.

* * * * *